ns501B2

United States Patent
Lee et al.

(10) Patent No.: US 11,190,801 B2
(45) Date of Patent: Nov. 30, 2021

(54) VIDEO ENCODING METHOD WITH SYNTAX ELEMENT SIGNALING OF MAPPING FUNCTION EMPLOYED BY CUBE-BASED PROJECTION AND ASSOCIATED VIDEO DECODING METHOD

(71) Applicant: MEDIATEK INC., Hsin-Chu (TW)

(72) Inventors: Ya-Hsuan Lee, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/899,575

(22) Filed: Jun. 11, 2020

(65) Prior Publication Data
US 2021/0006832 A1   Jan. 7, 2021

Related U.S. Application Data

(60) Provisional application No. 62/903,056, filed on Sep. 20, 2019, provisional application No. 62/871,840, (Continued)

(51) Int. Cl.
*H04N 19/597* (2014.01)
*G06T 3/00* (2006.01)
*H04N 19/70* (2014.01)

(52) U.S. Cl.
CPC ......... *H04N 19/597* (2014.11); *G06T 3/0062* (2013.01); *G06T 3/0087* (2013.01); *H04N 19/70* (2014.11)

(58) Field of Classification Search
CPC .... H04N 19/597; H04N 19/70; G06T 3/0062; G06T 3/0087
(Continued)

(56) References Cited

U.S. PATENT DOCUMENTS 10,404,960 B2   9/2019  Budagavi
10,841,566 B2   11/2020 He
(Continued)

FOREIGN PATENT DOCUMENTS

CN   109246422 A   1/2019
CN   109417632 A   3/2019
(Continued)

OTHER PUBLICATIONS

Ya-Hsuan Lee et al., CE13: Modified Cubemap Projection in JVET-J0019 (Test 5), Joint Video Experts Team (JVET) of ITU-T SG 16 WP 3 and ISO/IEC JTC 1/SC 29/WG 11, Document: JVET-K0131-v1, 11th Meeting: Ljubljana, SI, Jul. 10-18, 2018, pp. 1-5.
(Continued)

*Primary Examiner* — Anner N Holder
*Assistant Examiner* — Matthew David Kim
(74) *Attorney, Agent, or Firm* — Winston Hsu

(57) ABSTRACT

A video encoding method includes: encoding a projection-based frame to generate a part of a bitstream, wherein at least a portion of a 360-degree content of a sphere is mapped to projection faces via cube-based projection, and the projection-based frame has the projection faces packed in a cube-based projection layout; and signaling at least one syntax element via the bitstream, wherein said at least one syntax element is associated with a mapping function that is employed by the cube-based projection to determine sample locations for each of the projection faces.

10 Claims, 3 Drawing Sheets

Related U.S. Application Data filed on Jul. 9, 2019, provisional application No. 62/869,627, filed on Jul. 2, 2019.

(58) Field of Classification Search
USPC .................................................. 375/240.12
See application file for complete search history.

(56) References Cited

U.S. PATENT DOCUMENTS

| | | | |
|---|---|---|---|
| 2017/0280126 A1* | 9/2017 | Van der Auwera | ... G06T 3/0062 |
| 2018/0103242 A1 | 4/2018 | Budagavi | |
| 2018/0130175 A1* | 5/2018 | Lin | ...... H04N 13/111 |
| 2018/0192001 A1 | 7/2018 | Boyce | |
| 2018/0192074 A1 | 7/2018 | Shih | |
| 2018/0268517 A1* | 9/2018 | Coban | .................. H04N 19/174 |
| 2019/0005683 A1 | 1/2019 | Van Der Auwera | |
| 2019/0158815 A1 | 5/2019 | He | |
| 2019/0191203 A1 | 6/2019 | Asbun | |
| 2019/0200023 A1* | 6/2019 | Hanhart | ............... H04N 19/184 |
| 2019/0215532 A1 | 7/2019 | He | |
| 2019/0289316 A1 | 9/2019 | Shih | |
| 2020/0045336 A1 | 2/2020 | Xiu | |
| 2020/0092582 A1* | 3/2020 | Xiu | ...................... H04N 19/597 |
| 2020/0260063 A1 | 8/2020 | Hannuksela | |
| 2020/0322632 A1 | 10/2020 | Hanhart | |
| 2021/0006838 A1 | 1/2021 | Lee | |
| 2021/0014472 A1 | 1/2021 | He | |

FOREIGN PATENT DOCUMENTS

| | | |
|---|---|---|
| CN | 110521204 A | 11/2019 |
| TW | 201921950 A | 6/2019 |
| WO | 2018/035721 A1 | 3/2018 |
| WO | 2018/064967 A1 | 4/2018 |
| WO | 2018/066983 A1 | 4/2018 |
| WO | 2018/093851 A1 | 5/2018 |
| WO | 2018/184528 A1 | 10/2018 |
| WO | 2018/218028 A1 | 11/2018 |
| WO | 2019/062714 A1 | 4/2019 |
| WO | 2019/083943 A1 | 5/2019 |
| WO | 2019/194573 A1 | 10/2019 |

OTHER PUBLICATIONS

"International Search Report" dated Sep. 29, 2020 for International application No. PCT/CN2020/099863, International filing date:Jul. 2, 2020.

"International Search Report" dated Sep. 30, 2020 for International application No. PCT/CN2020/099888, International filing date:Jul. 2, 2020.

"International Search Report" dated Oct. 12, 2020 for International application No. PCT/CN2020/099847, International filing date:Jul. 2, 2020.

Xuchang Huangfu et al., Parallel-to-Axis Uniform Cubemap Projection for Omnidirectional Video, 2019 IEEE International Symposium on Circuits and Systems (ISCAS), May 26-29, 2019, Sapporo, Japan, IEEE, pp. 1-5.

Ya-Hsuan Lee et al., AHG6/AHG9:Signalling guard band type for generalized cubemap projection, Joint Video Experts Team (JVET) of ITU-T SG 16 WP 3 and ISO/IEC JTC 1/SC 29/WG 11, 17th Meeting: Brussels, BE, Jan. 7-17, 2020, Document:JVET-Q0343-v1, pp. 1-7, sections 1-3.

Robert Skupin et al., AHG6: 360-degree video related SEI messages, Joint Video Experts Team (JVET) of ITU-T SG 16 WP 3 and ISO/IEC JTC 1/SC 29/WG 11, 16th Meeting: Geneva, CH, Oct. 1-11, 2019, Document:JVET-P0462-v1, pp. 1-2, section 2.

"International Search Report" dated Mar. 25, 2013 for International application No. PCT/CN2020/141395, International filing date:Dec. 30, 2020, pp. 1-10.

* cited by examiner

VIDEO ENCODING METHOD WITH SYNTAX ELEMENT SIGNALING OF MAPPING FUNCTION EMPLOYED BY CUBE-BASED PROJECTION AND ASSOCIATED VIDEO DECODING METHOD

CROSS REFERENCE TO RELATED APPLICATIONS

This application claims the benefit of U.S. provisional application No. 62/869,627 filed on Jul. 2, 2019, U.S. provisional application No. 62/871,840 filed on Jul. 9, 2019, and U.S. provisional application No. 62/903,056 filed on Sep. 20, 2019. The entire contents of the related applications, including U.S. provisional application No. 62/869,627, U.S. provisional application No. 62/871,840, and U.S. provisional application No. 62/903,056, are incorporated herein by reference.

BACKGROUND

The present invention relates to video encoding and video decoding, and more particularly, to a video encoding method with syntax element signaling of a mapping function employed by cube-based projection and an associated video decoding method.

Virtual reality (VR) with head-mounted displays (HMDs) is associated with a variety of applications. The ability to show wide field of view content to a user can be used to provide immersive visual experiences. A real-world environment has to be captured in all directions, resulting in an omnidirectional video corresponding to a viewing sphere. With advances in camera rigs and HMDs, the delivery of VR content may soon become the bottleneck due to the high bitrate required for representing such a 360-degree content. When the resolution of the omnidirectional video is 4K or higher, data compression/encoding is critical to bitrate reduction.

In general, the omnidirectional video corresponding to a sphere is transformed into a frame with a 360-degree image content represented by projection faces arranged in a 360-degree Virtual Reality (360 VR) projection layout, and then the resulting frame is encoded into a bitstream for transmission. Suppose that the conventional cubemap projection (CMP) is used to project the 360-degree content on the sphere onto six faces of the cube. Due to inherent characteristics of the conventional CMP, the sampling rate near the projection face center is much lower than the projection face boundary. Thus, there is a need for a modified cubemap projection design that can adjust the sampling distribution of the conventional CMP to achieve a more uniform sampling rate, and can signal syntax element(s) associated with the modified cubemap projection to a video decoder.

SUMMARY

One of the objectives of the claimed invention is to provide a video encoding method with syntax element signaling of a mapping function employed by cube-based projection and an associated video decoding method.

According to a first aspect of the present invention, an exemplary video encoding method is disclosed. The exemplary video encoding method includes: encoding a projection-based frame to generate a part of a bitstream, wherein at least a portion of a 360-degree content of a sphere is mapped to projection faces via cube-based projection, and the projection-based frame has the projection faces packed in a cube-based projection layout; and signaling at least one syntax element via the bitstream, wherein said at least one syntax element is associated with a mapping function that is employed by the cube-based projection to determine sample locations for each of the projection faces.

According to a second aspect of the present invention, an exemplary video decoding method is disclosed. The exemplary video decoding method includes: decoding a part of a bitstream to generate a decoded frame, wherein the decoded frame is a projection-based frame that has projection faces packed in a cube-based projection layout, and at least a portion of 360-degree content of a sphere is mapped to the projection faces via cube-based projection; and parsing at least one syntax element from the bitstream, wherein said at least one syntax element is associated with a mapping function that is employed by the cube-based projection to determine sample locations for each of the projection faces.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
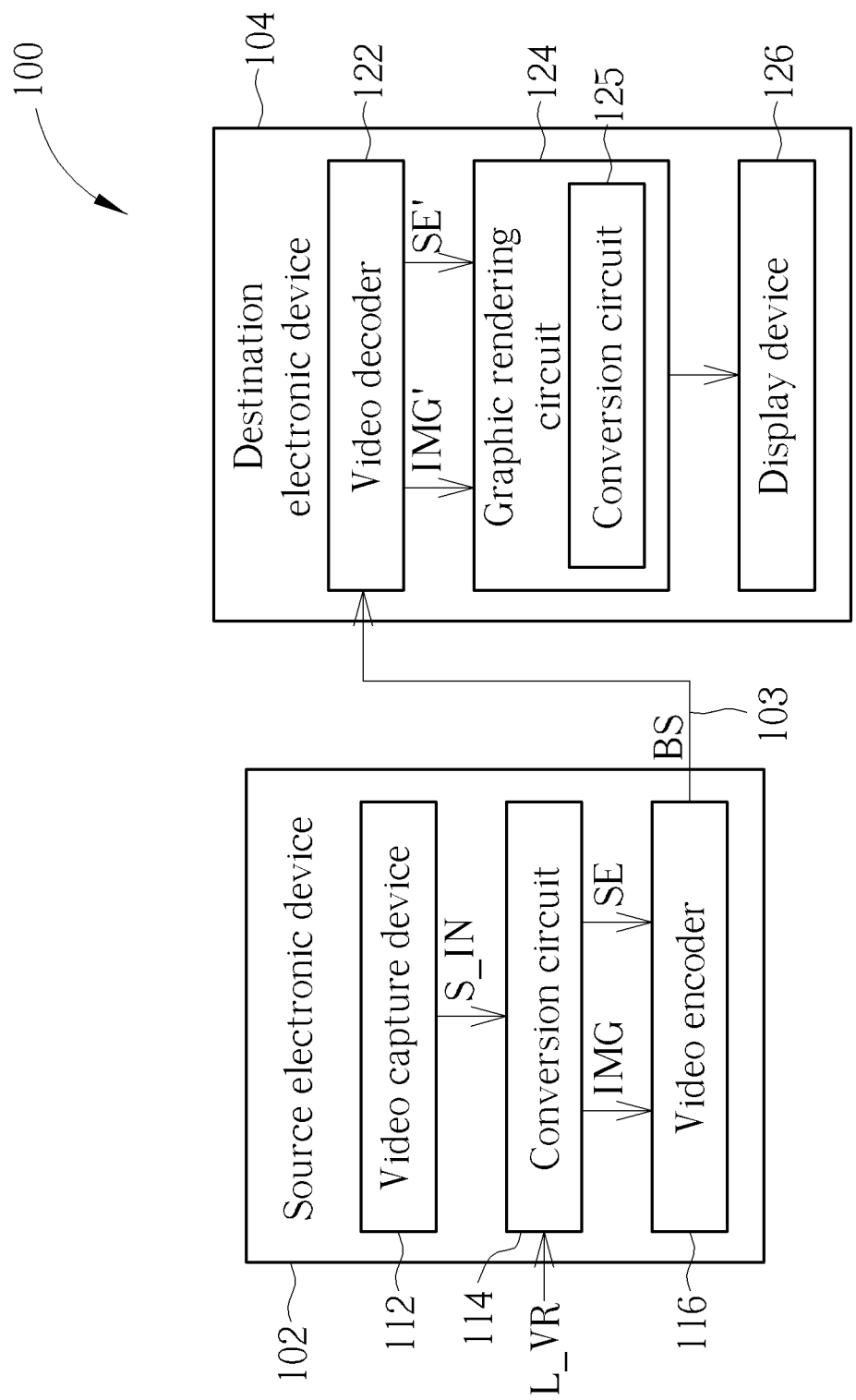
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes a source electronic device 102 and a destination device 104. The source electronic device 102 includes a video capture device 112, a conversion circuit 114, and a video encoder 116. For example, the video capture device 112 may be an omnidirectional camera. The conversion circuit 114 generates a projection-based frame IMG with a 360-degree Virtual Reality (360 VR) projection layout L_VR according to an omnidirectional video frame S_IN corresponding to a sphere, where the omnidirectional video frame S_IN contains a 360-degree content of the sphere. The video encoder 116 is an encoding circuit that encodes the projection-based frame IMG (which has projection faces packed in the 360

VR projection layout L_VR) to generate a part of a bitstream BS, and outputs the bitstream BS to the destination electronic device 104 via a transmission means 103 such as a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit that receives the bitstream BS from the transmission means 103 (e.g., wired/wireless communication link or storage medium), and decodes a part of the received bitstream BS to generate a decoded frame IMG'. In this embodiment, the projection-based frame IMG to be encoded by the video encoder 116 has a 360 VR projection layout L_VR. Hence, after a part of the bitstream BS is decoded by the video decoder 122, the decoded frame (i.e., reconstructed frame) IMG' has the same 360 VR projection layout L_VR. In other words, the decoded frame IMG' is also a projection-based frame that has projection faces packed in the 360 VR projection layout L_VR. The graphic rendering circuit 124 is arranged to drive the display device 126 to show an image content of a viewport area selected by a user. The graphic rendering circuit 124 may include a conversion circuit 125 that is arranged to process a portion of the image content carried by the decoded frame IMG' for obtaining pixel data associated with the image content of the selected viewport area.

In this embodiment, the 360 VR projection layout L_VR is a cube-based projection layout. Hence, projection faces derived from different faces of a cube are packed in the cube-based projection layout that is employed by the projection-based frame IMG/decoded frame IMG'. In one embodiment, cube-based projection with six square projection faces representing full 360°×180° omnidirectional video (i.e., all of a 360-degree of a sphere) may be employed. In another embodiment, cube-based projection with five projection faces (which include one full face and four half faces) representing 180°×180° omnidirectional video (i.e., part of a 360-degree content of a sphere) may be employed. To put it simply, cube-based projection may be regular cubemap projection or hemisphere cubemap projection, depending upon actual design considerations. For brevity and simplicity, the following assumes that six square projection faces are obtained by the cube-based projection, and packed in the cube-based projection layout.

Figure 2:
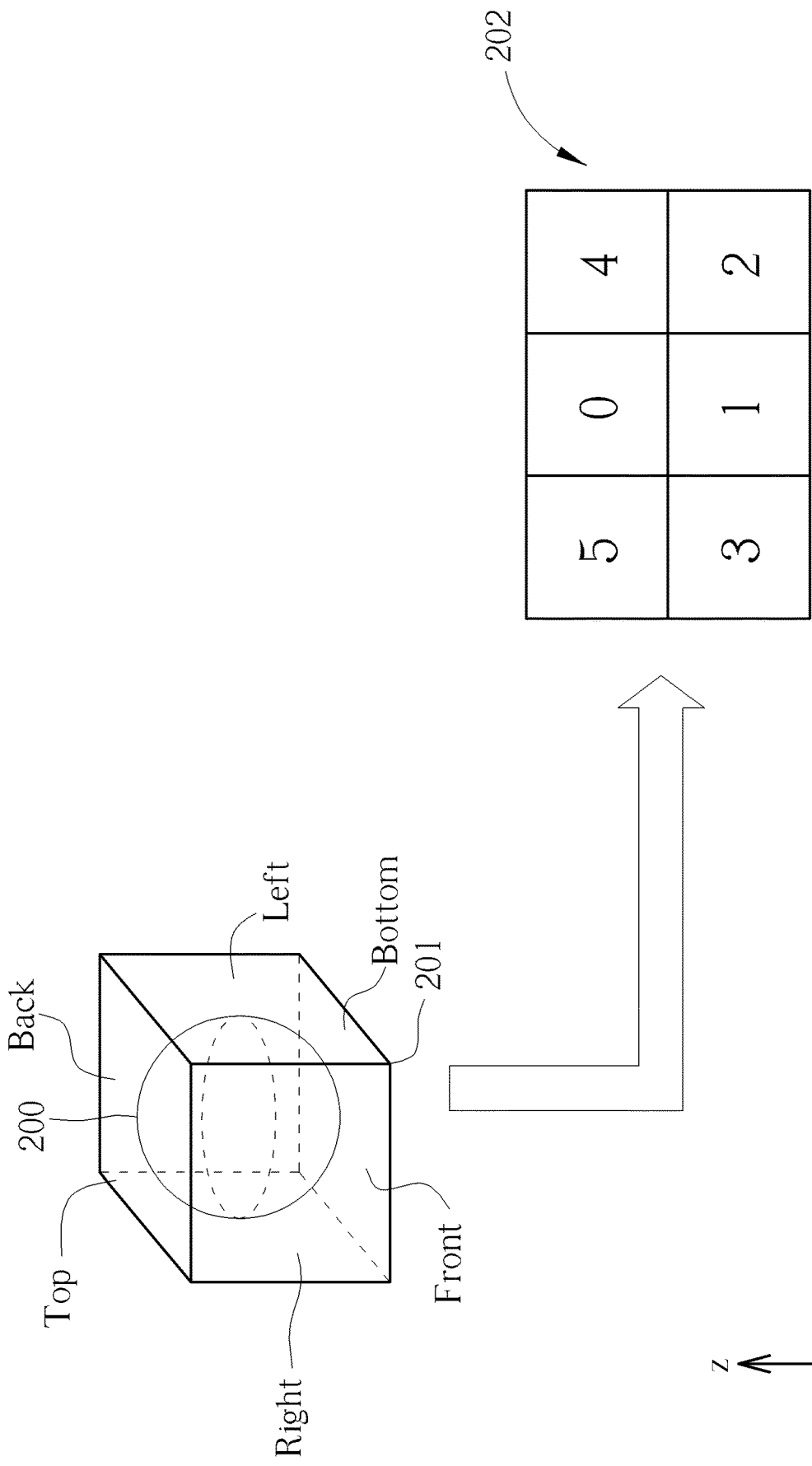
FIG. 2 is a diagram illustrating a cube-based projection according to an embodiment of the present invention.

Regarding the conversion circuit 114 of the source electronic device 102, cube-based projection is employed to generate square projection faces of a cube in a three-dimensional (3D) space. FIG. 2 is a diagram illustrating a cube-based projection according to an embodiment of the present invention. The 360-degree content on the sphere 200 is projected onto six faces of a cube 201, including a top face (labeled by "Top"), a bottom face (labeled by "Bottom"), a left face (labeled by "Left"), a front face (labeled by "Front"), a right face (labeled by "Right"), and a back face (labeled by "Back"). As shown in FIG. 2, an image content of a north polar region of the sphere 200 is projected onto the top face "Top", an image content of a south polar region of the sphere 200 is projected onto the bottom face "Bottom", and an image content of an equatorial region of the sphere 200 is projected onto the left face "Left", the front face "Front", the right face "Right", and the back face "Back".

In the 3D space that is defined by x-axis, y-axis, and z-axis, each point on six faces is located at (x, y, z), where $x, y, z \in [-1, 1]$. Hence, the front face "Front" is on an x-plane with x=1, the back face "Back" is on an x-plane with x=−1, the top face "Top" is on a z-plane with z=1, the bottom face "Bottom" is on a z-plane with z=−1, the left face "Left" is on a y-plane with y=1, and the right face "Right" is on a y-plane with y=−1.

Forward transformation is used to transform from the 3D space (x, y, z) to the 2D plane (u, v). Hence, the top face "Top", bottom face "Bottom", left face "Left", front face "Front", right face "Right", and back face "Back" of the cube 201 in the 3D space are transformed into a top face (labeled by "2"), a bottom face (labeled by "3"), a left face (labeled by "5"), a front face (labeled by "0"), a right face (labeled by "4"), and a back face (labeled by "1") on the 2D plane. Each face is on one 2D plane defined by u-axis and v-axis, and has each point located at (u, v).

Inverse transformation is used to transform from the 2D plane (u, v) to the 3D space (x, y, z). Hence, the top face (labeled by "2"), the bottom face (labeled by "3"), the left face (labeled by "5"), the front face (labeled by "0"), the right face (labeled by "4"), and the back face (labeled by "1") on the 2D plane are transformed into the top face "Top", bottom face "Bottom", left face "Left", front face "Front", right face "Right", and back face "Back" of the cube 201 in the 3D space.

Figure 3:
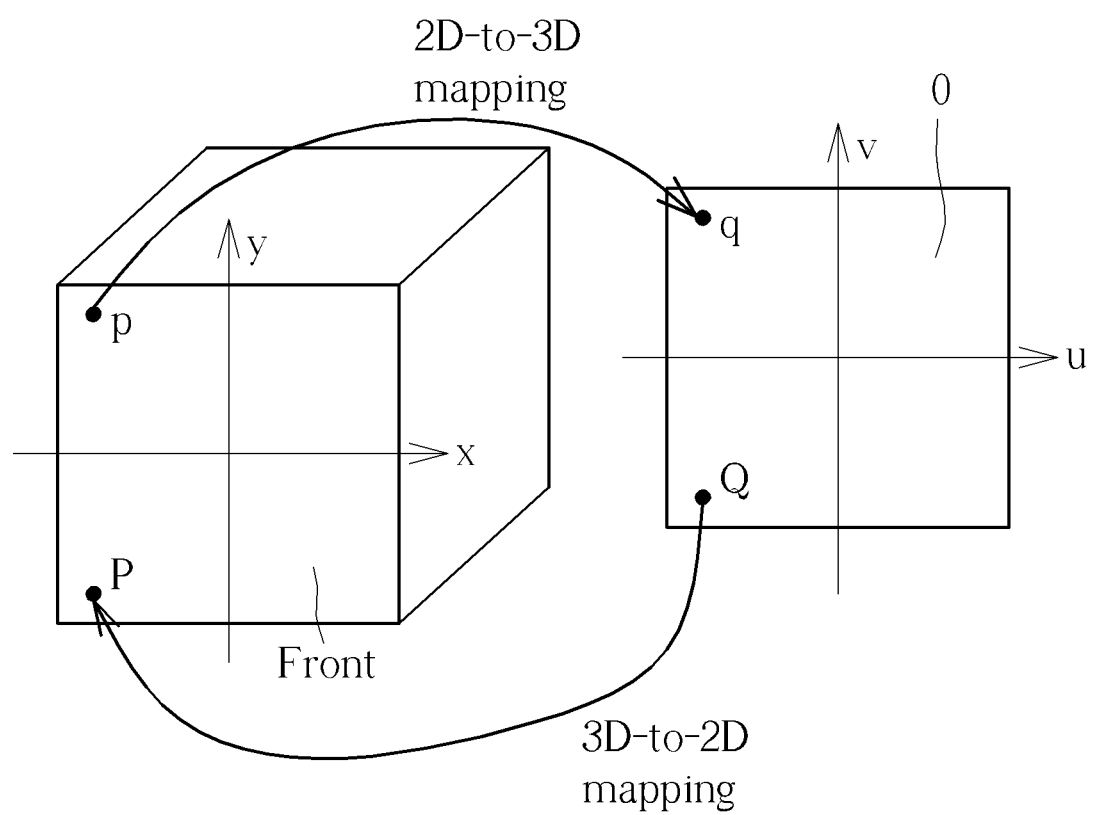
FIG. 3 is a diagram illustrating mapping between a square projection face of a cube in a 3D space and a square projection face on a 2D plane according to an embodiment of the present invention.

FIG. 3 is a diagram illustrating mapping between a square projection face of a cube in a 3D space and a square projection face on a 2D plane according to an embodiment of the present invention. For an integer pixel q with a 2D coordinate (u, v) on the front face "0", the 2D coordinate (u, v) can be mapped to a 3D coordinate (x, y, 1) of a point p on the front face "Front". Hence, the integer pixel q is set by the point p. Specifically, for any integer pixel included in the front face "0", its corresponding position in the front face "Front" can be found through 2D-to-3D mapping function used by the inverse transformation. In this way, the front face "0" on the 2D plane can be determined by inverse transformation of the front face "Front" in the 3D space.

The inverse transformation can be employed by the conversion circuit 114 of the source electronic device 102 for generating the top face "2", bottom face "3", left face "5", front face "0", right face "4", and back face "1". The top face "2", bottom face "3", left face "5", front face "0", right face "4", and back face "1" on the 2D plane are packed to form the projection-based frame IMG to be encoded by the video encoder 116. The projection-based frame IMG to be encoded is required to be rectangular. For example, the projection-based frame IMG can have projected image data arranged in the compact cube-based projection layout 202 to avoid using dummy areas (e.g., black areas, gray areas, or white areas). Since the present invention does not focus on the cube-based projection layout design, further description of the compact cube-based projection layout 202 is omitted here for brevity.

The video decoder 122 receives the bitstream BS from the transmission means 103, and decodes a part of the received bitstream BS to generate the decoded frame IMG' that has the same projection layout L_VR (e.g., compact cube-based projection layout 202) adopted at the encoder side. Regarding the conversion circuit 125 of the destination electronic device 104, forward transformation is used to transform from the 3D space (x, y, z) to the 2D plane (u, v) for determining pixel values of pixels in any of the top face "Top", bottom face "Bottom", left face "Left", front face "Front", right face "Right", and back face "Back". Or the inverse transformation is used to transform from the 2D space (u, v) to the 3D plane (x, y, z) for remapping the sample locations of a projection-based frame to the sphere.

Please refer to FIG. 3 again. For an integer pixel P with a 3D coordinate (x, y, 1) in the front face "Front", the 3D coordinate (x, y, 1) can be mapped to a 2D coordinate (u, v) of a point Q on the front face "0". Hence, the integer pixel P is set by the point Q. Specifically, for any integer pixel included in the front face "Front", its corresponding position in the front face "0" can be found through 3D-to-2D mapping function used by the forward transformation.

Suppose that the conventional cubemap projection (CMP) is used to project the 360-degree content on the sphere 200 onto six faces "Top", "Bottom", "Right", Front", "Left", and "Back" of the cube 201. The sampling rate near the cube face center is much lower than the cube face boundary. In other words, the sampling distribution of the conventional CMP is not uniform. To address this issue, the present invention proposes a modified cubemap projection design that can adjust the sampling distribution of the traditional CMP by applying a mapping function on (u, v) (e.g., $f_x(u, v)$ and $f_y(u, v)$) to achieve a more uniform sampling rate. In some embodiments of the present invention, the 2D-to-3D mapping function used by the inverse transformation and the 3D-to-2D mapping function used by the forward transformation at the conversion circuit 114 and 125 can adopt a parameterized mapping function $$\begin{cases} f_x(u, v) = \dfrac{u}{1 + a_u(1 - b_u v^2)(1 - u^2)} \\ f_y(u, v) = \dfrac{v}{1 + a_v(1 - b_v u^2)(1 - v^2)} \end{cases},$$

where a location of a point of a square projection face on a 2D plane (e.g. "0" "1" "2" "3" "4" or "5" shown in FIG. 2) is represented by (u, v), and a location of a point of a square projection face in a 3D space (e.g., "Front", "Back", "Top", "Bottom", "Left", or "Right" shown in FIG. 2) is represented by ($f_x(u, v)$, $f_y(u, v)$). Moreover, coefficients $a_u$, $b_u$, $a_v$, and $b_v$ of the parameterized mapping function are specified by syntax elements that are signaled via the bitstream BS. The parameterized mapping function is for illustrative purposes only, and is not meant to be a limitation of the present invention. For example, coefficients of $F_x(u, v)$ may include one or both of $a_u$ and $b_u$, and coefficients of $F_y(u, v)$ may include one or both of $a_v$ and $b_v$.

For better understanding of technical features of the present invention, several exemplary syntax signaling methods are described as below. The video encoder 116 may employ one of the proposed syntax signaling methods to signal syntax element(s) SE indicative of configuration information of a mapping function employed by the conversion circuit 114, and the video decoder 122 may parse syntax element(s) SE' signaled by one proposed syntax signaling method employed by the video encoder 116 and may provide the graphic rendering circuit 124 (particularly, conversion circuit 125) with the parsed syntax element(s) SE', such that the graphic rendering circuit 124 (particularly, conversion circuit 125) is informed of the configuration information of the mapping function employed by the conversion circuit 114. In this way, when determining an image content of a viewport area selected by a user, the conversion circuit 125 can refer to the configuration information of the mapping function to perform transformation correctly. Ideally, syntax element(s) SE encoded into the bitstream BS by the video encoder 116 are the same as the syntax element(s) SE' parsed from the bitstream BS by the video decoder 122.

It should be noted that the descriptors in the following exemplary syntax tables specify the parsing process of each syntax element. For example, the syntax elements could be coded by fixed length coding (e.g., u(n)). Taking the descriptor u(n) for example, it describes an unsigned integer using n bits. However, this is for illustrative purposes only, and is not meant to be a limitation of the present invention. In practice, the syntax elements may be coded by fixed length coding (e.g., f(n), i(n) or u(n)) and/or variable length coding (e.g., ce(v), se(v) or ue(v)). The descriptor f(n) means a fixed-pattern bit string using n bits written (from left to right) with the left bit first. The descriptor i(n) means a signed integer using n bits. The descriptor ce(v) means a context-adaptive variable-length entropy-coded syntax element with the left bit first. The descriptor se(v) means a signed integer Exp-Golomb-coded syntax element with the left bit first. The syntax element ue(v) means an unsigned integer Exp-Golomb-coded syntax element with the left bit first.

In accordance with a first syntax signaling method, the following syntax table may be employed.

| | Descriptor |
|---|---|
| generalized_cubemap_projection( payloadSize ) { | |
| ... | |
|   gcmp_mapping_function_type | u(2) |
|   for ( i = 0; i < num_of_faces; i++ ) { | |
|     ... | |
|     if( gcmp_mapping_function_type = = 2 ) { | |
|       gcmp_function_coeff_u[ i ] | u(7) |
|       gcmp_function_u_affected_by_v_flag[ i ] | u(1) |
|       gcmp_function_coeff_v[ i ] | u(7) |
|       gcmp_function_v_affected_by_u_flag[ i ] | u(1) |
|     } | |
|   } | |
|   ... | |
| } | |

The syntax element gcmp_mapping_function_type is set to specify the mapping function used to adjust the sample locations of the cubemap projection. The value of gcmp_mapping_function_type shall be in the range of 0 to 2, inclusive.

If the syntax element gcmp_mapping_function_type is equal to 0, it indicates that the conventional CMP as specified by the cubemap projection supplemental enhancement information (SEI) message in Rec. ITU-T H.265|ISO/IEC 23008-2 and Rec. ITU-T H.264|ISO/IEC 14496-10, is used. For example, in a case where gcmp_mapping_function_type=0, the mapping function employed by the conventional cubemap projection without sampling distribution adjustment may be expressed as $$\begin{cases} f_x(u) = u \\ f_y(v) = v \end{cases}.$$

If the syntax element gcmp_mapping_function_type is equal to 1, it indicates that the equi-angular mapping function is employed to adjust sample locations of all square projection faces. For example, in a case where gcmp_mapping_function_type=1, the mapping function employed by the equi-angular cubemap (EAC) projection with sampling distribution adjustment may be expressed as $$\begin{cases} f_x(u) = \tan\left(u * \dfrac{\pi}{4}\right) \\ f_y(v) = \tan\left(v * \dfrac{\pi}{4}\right) \end{cases}.$$

If the syntax element gcmp_mapping_function_type is equal to 2, it indicates that the parameterized mapping function mentioned above is employed to adjust sample locations of all square projection faces. In addition, coefficients of the parameterized mapping function used to adjust the sample locations of the $i^{th}$ projection face (i.e., a projection face located on the face position index i in the cube-based projection layout) are specified by syntax elements gcmp_function_coeff_u[i], gcmp_function_u_affected_by_v_flag[i], gcmp_function_coeff_v[i], and gcmp_function_v_affected_by_u_flag[i], where the front face is assigned with a face index gcmp_face_index[i]==0, the back face is assigned with a face index gcmp_face_index[i]==1, the top face is assigned with a face index gcmp_face_index[i]==2, the bottom face is assigned with a face index gcmp_face_index[i]==3, the right face is assigned with a face index gcmp_face_index[i]==4, and the left face is assigned with a face index gcmp_face_index[i]==5.

The syntax element gcmp_function_coeff_u[i] specifies the coefficient used in the parameterized mapping function of the u-axis of the $i^{th}$ projection face. For example, $a_u$=(gcmp_function_coeff_u[i]+1)/$2^7$. When the syntax element gcmp_function_coeff_u[i] is not present, it is inferred to be equal to 0.

If the syntax element gcmp_function_u_affected_by_v_flag[i] is equal to 1, it indicates that the parameterized mapping function of the u-axis refers to the v position of the sample location. If the syntax element gcmp_function_u_affected_by_v_flag[i] is equal to 0, it indicates that the parameterized mapping function in u-axis does not refer to the v position of the sample location. For example, $b_u$=gcmp_junction_u_affected_by_v_flag[i].

The syntax element gcmp_function_coeff_v[i] is set to specify the coefficient used in the parameterized mapping function of the v-axis of the $i^{th}$ projection face. For example, $a_v$=(gcmp_function_coeff_v[i]+1)/$2^7$. When the syntax element gcmp_function_coeff_v[i] is not present, it is inferred to be equal to 0.

If the syntax element gcmp_function_v_affected_by_u_flag[i] is equal to 1, it indicates that the parameterized mapping function of the v-axis refers to the u position of the sample location. If the syntax element gcmp_function_v_affected_by_u_flag[i] is equal to 0, it indicates that the parameterized mapping function in v-axis does not refer to the u position of the sample location. For example, $b_v$=gcmp_function_v_affected_by_u_flag[i].

The 2D-to-3D mapping function employed by the conversion circuit 114 or 125 may be set by the conventional CMP mapping function with no sampling distribution adjustment, the EAC mapping function with sampling distribution adjustment, or the parameterized mapping function with sampling distribution adjustment, depending upon actual application requirements. In some embodiments of the present invention, inputs of the 2D-to-3D mapping process may include width faceWidth and height faceHeight of a projection face, and may further include a sample location (hPos, vPos) of the projection face on a 2D plane, where hPos∈[0, faceWidth] and vPos∈[0, faceHeight]; and a final output of the 2D-to-3D mapping process may include sphere coordinates ($\varphi$, $\theta$) for the sample location in degrees.

When the 2D-to-3D mapping process starts, the following applies:
hPos'=−(2*hPos÷faceWidth)+1, and
vPos'=−(2*vPos÷faceHeight)+1, where hPos',vPos'∈[−1,1].

If gcmp_mapping_function_type is equal to 0, the following applies:
hPos"=hPos', and
vPos"=vPos'.

If gcmp_mapping_function_type is equal to 1, the following applies:
hPos"=tan(hPos'*π÷4), and
vPos"=tan(vPos'*π÷4).

If gcmp_mapping_function_type is equal to 2, the following applies:
coeffU[n]=(gcmp_function_coeff_u[n]+1)÷128,
coeffV[n]=(gcmp_function_coeff_v[n]+1)÷128,
hPos"=hPos'÷[1+coeffU[n]*(1−gcmp_function_u_affected_by_v_flag[n]*vPos'$^2$)*(1−hPos'$^2$)]), and
vPos"=vPos'÷[1+coeffV[n]*(1−gcmp_function_v_affected_by_u_flag[n]*hPos'$^2$)*(1−vPos'$^2$)], where n represents a face position index in the cube-based projection layout. For example, regarding a sample location (hPos, vPos) of a projection face located at a face position index n in the cube-based projection layout, an adjusted sample position (hPos", hPos") can be obtained by the parameterized mapping function.

After the adjusted sample position (hPos", hPos") is obtained by the parameterized mapping function, the following applies:

```
If (gcmp_face_index[ n ] = = 0 ) {/* positive x front face */
  x = 1.0,
  y = hPos"
  z = vPos"
} else if (gcmp_face_index[ n ] = = 1 ) {/* negative x back face */
  x = −1.0
  y = −vPos"
  z = −hPos"
} else if (gcmp_face_index[ n ] = = 2 ) {/* positive z top face */
  x = −hPos"
  y = −vPos"
  z = 1.0
}else if (gcmp_face_index[ n ] = = 3 ) {/* negative z bottom face */
  x = hPos"
  y = −vPos"
  z = −1.0
}else if (gcmp_face_index[ n ] = = 5 ){/* positive y left face */
  x = −hPos"
  y = 1.0
  z = vPos"
}else if ( gcmp_face_index[ n ] = = 4 ) {/* negative y right face */
  x = hPos"
  y = −1.0
  z = vPos"
}
φ = Atan2( y, x)* 180 ÷ π
θ = Asin (z ÷ √(x²+y²+z²) ) * 180 ÷ π
```

With regard to the first mapping function design, the parameterized mapping function is applied to both of u-axis and v-axis of one projection face when gcmp_mapping_function_type is equal to 2. However, this is for illustrative purposes only, and is not meant to be a limitation of the present invention. Alternatively, the parameterized mapping function may be allowed to be applied to only one of u-axis and v-axis of one projection face when gcmp_mapping_function_type is equal to 2.

In accordance with a second syntax signaling method, the following syntax table may be employed.

| | Descriptor |
|---|---|
| generalized_cubemap_projection( payloadSize ) { | |
|     ... | |
|     gcmp_mapping_function_type | u(2) |
|     for( i = 0; i < num_of_faces; i++ ) { | |
|         ... | |
|         if( gcmp_mapping_function_type == 2 ) { | |
|         gcmp_u_axis_adjustment_function_enabled_flag[ i ] | u(1) |
|         if( gcmp_u_axis_adjustment_function_enabled_flag[ i ] ) | |
|     { | |
|             gcmp_function_coeff_u[ i ] | u(7) |
|             gcmp_function_u_affected_by_v_flag[ i ] | u(1) |
|         } | |
|         gcmp_v_axis_adjustment_function_enabled_flag[ i ] | u(1) |
|         if( gcmp_v_axis_adjustment_function_enabled_flag[ i ] ) | |
|     { | |
|             gcmp_function_coeff_v[ i ] | u(7) |
|             gcmp_function_v_affected_by_u_flag[ i ] | u(1) |
|         } | |
|         } | |
|     } | |
|     ... | |
| } | |

If the syntax element gcmp_u_axis_adjustment_function_enabled_flag[i] is equal to 0, it specifies that the sampling is not changed in u-axis. If the syntax element gcmp_u_axis_adjustment_function_enabled_flag[i] is equal to 1, it specifies that the parameterized mapping function is used to adjust the sampling with coefficients in u-axis. As mentioned above, coefficients of the parameterized mapping function applied to u-axis of ith projection face are specified by syntax elements gcmp_function_coeff_u[i] and gcmp_function_u_affected_by_v_flag[i].

If the syntax element gcmp_v_axis_adjustment_function_enabled_flag[i] is equal to 0, it specifies that the sampling is not changed in v-axis. If the syntax element gcmp_v_axis_adjustment_function_enabled_flag[i] is equal to 1, it specifies that the parameterized mapping function is used to adjust the sampling with coefficients in v-axis. As mentioned above, coefficients of the parameterized mapping function applied to v-axis of ith projection face are specified by syntax elements gcmp_function_coeff_v[i] and gcmp_function_v_affected_by_u_flag[i].

With regard to the first mapping function design and the second mapping function design, a mapping function employed by the conversion circuits 114 and 125 may be selected from a group consisting of the conventional CMP mapping function with no sampling distribution adjustment, the EAC mapping function with sampling distribution adjustment, and the parameterized mapping function with sampling distribution adjustment. However, this is for illustrative purposes only, and is not meant to be a limitation of the present invention. Alternatively, a mapping function employed by the conversion circuits 114 and 125 may be set by the parameterized mapping function only. Hence, the syntax element gcmp_mapping_function_type may be omitted without being signalled via the bitstream BS.

In accordance with a third syntax signaling method, the following syntax table may be employed.

| | Descriptor |
|---|---|
| generalized_cubemap_projection( payloadSize ) { | |
|     ... | |
|     for( i = 0; i < num_of_faces; i++ ) { | |
|         ... | |
|         gcmp_function_coeff_u[ i ] | u(7) |
|         gcmp_function_u_affected_by_v_flag[ i ] | u(1) |
|         gcmp_function_coeff_v[ i ] | u(7) |
|         gcmp_function_v_affected_by_u_flag[ i ] | u(1) |
|     } | |
|     ... | |
| } | |

In accordance with a fourth syntax signaling method, the following syntax table may be employed.

| | Descriptor |
|---|---|
| generalized_cubemap_projection( payloadSize ) { | |
|     ... | |
|     for( i = 0; i < num_of_faces; i++ ) { | |
|         ... | |
|         gcmp_u_axis_adjustment_function_enabled_flag[ i ] | u(1) |
|         if( gcmp_u_axis_adjustment_function_enabled_flag[ i ] ) | |
|     { | |
|             gcmp_function_coeff_u[ i ] | u(7) |
|             gcmp_function_u_affected_by_v_flag[ i ] | u(1) |
|         } | |
|         gcmp_v_axis_adjustment_function_enabled_flag[ i ] | u(1) |
|         if( gcmp_v_axis_adjustment_function_enabled_flag[ i ] ) | |
|     { | |

| | Descriptor |
|---|---|
| gcmp_function_coeff_v[ i ] | u(7) |
| gcmp_function_v_affected_by_u_flag[ i ] | u(1) |
| } | |
| } | |
| ... | |
| } | |

As a person skilled in the art can readily understand details of the third mapping function design and the fourth mapping function design after reading above paragraphs directed to the first mapping function design and the second mapping function design, further description is omitted here for brevity.

In some embodiments of the present invention, the encoder-side conversion circuit 114 and the decoder-side conversion circuit 125 may be designed to support pre-defined mapping functions with fixed settings only. Hence, the syntax element gcmp_mapping_function_type may be signalled via the bitstream BS.

In accordance with a fifth syntax signaling method, the following syntax table may be employed.

| | Descriptor |
|---|---|
| generalized_cubemap_projection( payloadSize ) { | |
| ... | |
| gcmp_mapping_function_type | u(...) |
| } | |

The mapping function specified by the syntax element gcmp_mapping_function_type may be selected from a group consisting of a conventional cubemap projection, an equi-angular mapping function and a parameterized mapping function. In a case where a 2D-to-3D mapping function employed by the conversion circuit 114 or 125 is set by the conventional CMP mapping function with no sampling distribution adjustment, the syntax element gcmp_mapping_function_type may be set by 0 and then signaled via the bitstream BS. In another case where a 2D-to-3D mapping function employed by the conversion circuit 114 or 125 is set by the EAC mapping function with sampling distribution adjustment, the syntax element gcmp_mapping_function_type may be set by 1 and then signaled via the bitstream BS.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoding method comprising:
encoding a projection-based frame to generate a part of a bitstream, wherein at least a portion of a 360-degree content of a sphere is mapped to projection faces via cube-based projection, and the projection-based frame has the projection faces packed in a cube-based projection layout; and
signaling at least one syntax element via the bitstream, wherein said at least one syntax element is associated with a mapping function that is employed by the cube-based projection to determine sample locations for each of the projection faces;

wherein the mapping function is a parameterized mapping function employed by the cube-based projection to adjust sample locations for said each of the projection faces, said at least one syntax element signaled via the bitstream comprises a plurality of syntax elements that specify at least coefficients of the parameterized mapping function, and for said each of the projection faces, the plurality of syntax elements comprise:
a first syntax element, arranged to specify a coefficient used in the parameterized mapping function of a first axis; and
a second syntax element, arranged to indicate whether the parameterized mapping function of the first axis refers to a position value of a second axis, wherein when the second syntax element is set by a first logic value, an output of the parameterized mapping function of the first axis is determined by jointly considering a position value of the first axis and the position value of the second axis; and when the second syntax element is set by a second logic value, the output of the parameterized mapping function of the first axis is determined by considering only one of the position value of the first axis and the position value of the second axis.

2. The video encoding method of claim 1, wherein said at least one syntax element signaled via the bitstream further comprises:
a third syntax element, arranged to specify that the parameterized mapping function is employed by the cube-based projection.

3. The video encoding method of claim 1, wherein for said each of the projection faces, the plurality of syntax elements further comprise:
a third syntax element, arranged to specify a coefficient used in the parameterized mapping function of a second axis.

4. The video encoding method of claim 3, wherein for said each of the projection faces, the plurality of syntax elements further comprise:
a fourth syntax element, arranged to indicate whether the parameterized mapping function of the second axis refers to the position value of the first axis, wherein when the fourth syntax element is set by the first logic value, an output of the parameterized mapping function of the second axis is determined by jointly considering the position value of the second axis and the position value of the first axis; and when the fourth syntax element is set by the second logic value, the output of the parameterized mapping function of the second axis is determined by considering only one of the position value of the first axis and the position value of the second axis.

5. The video encoding method of claim 1, wherein an adjusted sample location ($f_x(u, v)$, $f_y(u, v)$) is obtained from applying the parameterized mapping function to a target sample location (u, v) on one of the projection faces, and the parameterized mapping function is expressed by:

$$\begin{cases} f_x(u, v) = \dfrac{u}{1 + a_u(1 - b_u v^2)(1 - u^2)} \\ f_y(u, v) = \dfrac{v}{1 + a_v(1 - b_v u^2)(1 - v^2)} \end{cases},$$

where coefficients $a_u$, $b_u$, $a_v$, and $b_v$ of the parameterized mapping function are specified by the plurality of syntax elements signaled via the bitstream.

6. A video decoding method comprising:

decoding a part of a bitstream to generate a decoded frame, wherein the decoded frame is a projection-based frame that has projection faces packed in a cube-based projection layout, and at least a portion of a 360-degree content of a sphere is mapped to the projection faces via cube-based projection; and parsing at least one syntax element from the bitstream, wherein said at least one syntax element is associated with a mapping function that is employed by the cube-based projection to determine sample locations for each of the projection faces;

wherein the mapping function is a parameterized mapping function employed by the cube-based projection to adjust sample locations for said each of the projection faces, said at least one syntax element parsed from the bitstream comprises a plurality of syntax elements that specify coefficients of the parameterized mapping function, and for said each of the projection faces, the plurality of syntax elements comprise:

a first syntax element, arranged to specify a coefficient used in the parameterized mapping function of a first axis; and a second syntax element, arranged to indicate whether the parameterized mapping function of the first axis refers to a position value of a second axis, wherein when the second syntax element is set by a first logic value, an output of the parameterized mapping function of the first axis is determined by jointly considering a position value of the first axis and the position value of the second axis; and when the second syntax element is set by a second logic value, the output of the parameterized mapping function of the first axis is determined by considering only one of the position value of the first axis and the position value of the second axis.

7. The video decoding method of claim 6, wherein said at least one syntax element parsed from the bitstream further comprises:

a third syntax element, arranged to specify that the parameterized mapping function is employed by the cube-based projection.

8. The video decoding method of claim 6, wherein for said each of the projection faces, the plurality of syntax elements further comprise:

a third syntax element, arranged to specify a coefficient used in the parameterized mapping function of a second axis.

9. The video decoding method of claim 8, wherein for said each of the projection faces, the plurality of syntax elements further comprise:

a fourth syntax element, arranged to indicate whether the parameterized mapping function of the second axis refers to the position value of the first axis, wherein when the fourth syntax element is set by the first logic value, an output of the parameterized mapping function of the second axis is determined by jointly considering the position value of the second axis and the position value of the first axis; and when the fourth syntax element is set by the second logic value, the output of the parameterized mapping function of the second axis is determined by considering only one of the position value of the first axis and the position value of the second axis.

10. The video decoding method of claim 6, wherein an adjusted sample location ($f_x(u, v)$, $f_y(u, v)$) is obtained from applying the parameterized mapping function to a target sample location (u, v) on one of the projection faces, and the parameterized mapping function is expressed by:

$$\begin{cases} f_x(u, v) = \dfrac{u}{1 + a_u(1 - b_u v^2)(1 - u^2)} \\ f_y(u, v) = \dfrac{v}{1 + a_v(1 - b_v u^2)(1 - v^2)} \end{cases},$$

where coefficients $a_u$, $b_u$, $a_v$, and $b_v$ of the parameterized mapping function are specified by the plurality of syntax elements parsed from the bitstream.

\* \* \* \* \*